(12) United States Patent
Lettmann et al.

(10) Patent No.: US 10,358,520 B2
(45) Date of Patent: *Jul. 23, 2019

(54) POLYMER IN MULTICOAT COLOR AND/OR EFFECT PAINT SYSTEMS

(71) Applicant: BASF Coatings GmbH, Muenster (DE)

(72) Inventors: Bernhard Lettmann, Drensteinfurt (DE); Peter Hoffmann, Senden (DE); Raphaela Jasper, Muenster (DE); Kai Kuhn, Nottuln (DE); Heinz-Juergen Kemper, Dortmund (DE); Marion Siegert, Steinfurt (DE)

(73) Assignee: BASF Coatings GmbH, Muenster (DE)

( * ) Notice: Subject to any disclaimer, the term of this patent is extended or adjusted under 35 U.S.C. 154(b) by 274 days.

This patent is subject to a terminal disclaimer.

(21) Appl. No.: 15/121,701

(22) PCT Filed: Jan. 9, 2015

(86) PCT No.: PCT/EP2015/050311
§ 371 (c)(1),
(2) Date: Aug. 25, 2016

(87) PCT Pub. No.: WO2015/128107
PCT Pub. Date: Sep. 3, 2015

(65) Prior Publication Data
US 2016/0369037 A1  Dec. 22, 2016

(30) Foreign Application Priority Data
Feb. 26, 2014 (EP) .................................. 14156823

(51) Int. Cl.
| C09D 175/04 | (2006.01) |
| B05D 7/00 | (2006.01) |
| C09D 175/08 | (2006.01) |
| C08G 18/48 | (2006.01) |
| C08G 18/40 | (2006.01) |
| C08G 18/66 | (2006.01) |
| C08G 18/75 | (2006.01) |
| C08G 18/08 | (2006.01) |
| C08G 18/12 | (2006.01) |
| C08G 18/34 | (2006.01) |
| C08G 18/42 | (2006.01) |

(52) U.S. Cl.
CPC ......... *C08G 18/4063* (2013.01); *B05D 7/57* (2013.01); *C08G 18/0823* (2013.01); *C08G 18/12* (2013.01); *C08G 18/348* (2013.01); *C08G 18/4018* (2013.01); *C08G 18/4252* (2013.01); *C08G 18/4854* (2013.01); *C08G 18/6625* (2013.01); *C08G 18/755* (2013.01); *C08G 18/758* (2013.01); *C09D 175/04* (2013.01); *C09D 175/08* (2013.01)

(58) Field of Classification Search
CPC .................................................. C08G 18/4854
See application file for complete search history.

(56) References Cited

U.S. PATENT DOCUMENTS

| 4,423,179 | A | 12/1983 | Guagliardo |
| 5,370,910 | A | 12/1994 | Hille et al. |
| 5,512,322 | A | 4/1996 | Hille et al. |
| 6,632,915 | B1 | 10/2003 | Schwarte et al. |
| 2014/0065428 | A1* | 3/2014 | Hoffmann ............ C09D 175/04 428/423.1 |

FOREIGN PATENT DOCUMENTS

| DE | 199 14 896 A1 | 10/2000 |
| DE | 199 30 665 A1 | 1/2001 |
| DE | 199 42 515 A1 | 3/2001 |
| DE | 199 48 004 A1 | 7/2001 |
| DE | 100 43 405 C1 | 6/2002 |
| EP | 0 228 003 A1 | 7/1987 |
| EP | 0 521 928 B1 | 8/1994 |
| EP | 0 634 431 A1 | 1/1995 |
| WO | WO 90/01041 A1 | 2/1990 |
| WO | WO 92/15405 A1 | 9/1992 |
| WO | WO 97/49745 A1 | 12/1997 |
| WO | WO 97/49747 A1 | 12/1997 |

OTHER PUBLICATIONS

International Search Report dated Mar. 13, 2015, in PCT/EP2015/050311 filed Jan. 9, 2015.

* cited by examiner

*Primary Examiner* — Francisco W Tschen
(74) *Attorney, Agent, or Firm* — Oblon, McClelland, Maier & Neustadt, L.L.P.

(57) ABSTRACT

The present invention relates to a polymer, preparable by reacting
at least one polymer, preparable by reacting (a) dimer fatty acids with at least (b) one polyether having a C3 to C6 alkylene radical and a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number <10 mg KOH/a, at least one polyether with a C3 to C6 alkylene radical and with a number-average molecular weight of 250 to 3000 g/mol, at least one compound having at least one anionic group and/or at least one functional group capable of forming anions,
and at least one, more particularly at least two, isocyanate-reactive functional groups, at least one polyisocyanate, and
optionally at least one monool or diol, at least one compound having more than two isocyanate-reactive functional groups, and optionally neutralizing the groups of component (C) that are capable of forming anions.

15 Claims, No Drawings

POLYMER IN MULTICOAT COLOR AND/OR EFFECT PAINT SYSTEMS

This application is a National Stage of PCT/EP2015/050311, which was filed on Jan. 9, 2018. This application is based upon and claims the benefit of priority to European. Application No. 14156823.8, which was filed on Feb. 26, 2014.

The invention relates to an innovative polymer. It further relates to a pigmented aqueous basecoat material which comprises this polymer, and to the use of said polymer in pigmented aqueous basecoat materials. It further relates to a method for producing multicoat paint systems, and also to the multicoat paint systems producible by means of said method. Moreover, the present invention relates to the refinish of defect areas on multicoat paint systems.

The prior art has disclosed a host of methods for producing multicoat color and/or effect paint systems. Known from the prior art (cf., e.g., German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) is the following method, which involves (1) applying a pigmented aqueous basecoat material to a substrate,
(2) forming a polymer film from the coating material applied in stage (1),
(3) applying a clearcoat material to the resulting basecoat film, and subsequently
(4) curing the basecoat film together with the clearcoat film.

This method is widely practiced, for example, both for the original (OEM) finishing of motor vehicles, and for the painting of metal and plastic parts for installation in or on vehicles. In the course of these operations, under certain conditions, adhesion problems occur, particularly between basecoat and clearcoat. Furthermore, the method is also used for the refinishing of motor vehicle bodies. This is a reference not only to OEM motor vehicle refinishing, but also to the motor vehicle refinishing which takes place, for example, in a workshop. A particular problem here is the adhesion between the original finish and the basecoat that is used for refinishing.

For aqueous basecoat materials, dispersions referred to as polyurethane dispersions have proven particularly suitable. Polyurethane dispersions frequently used are described in WO 90/01041, for example.

Generally, in the automotive refinish sector, systems known as mixer systems are often employed. A waterborne basecoat material is produced from these systems only at the premises of the end customer (refinisher), by the assembly of the various components.

The end customer receives mixing formula; this formula comprises a mixture of different pigmented film-forming components, from which the target shade is produced. Together with further components, the waterborne basecoat material is produced. A mixer system of this kind has been described in DE 19942515.

It was an object of the present invention to provide polymer which can be used to produce coatings which do not have the above-identified disadvantages of the prior art. This relates to an improvement in adhesion both in the painting of metallic and plastics substrates and in particular in automotive refinish.

An important factor in the painting of metallic and plastics substrates, as well as the adhesion of the basecoat to the substrate, is the adhesion between basecoat and clearcoat. In the case of automotive refinish, an important factor, alongside the adhesion between basecoat and clearcoat, is the adhesion between basecoat and original finish. This is to be improved in particular for use in automotive refinish.

The problems with adhesion are especially marked when the coated substrates are exposed to weathering. The object of the present invention was therefore also to provide coatings which still possess outstanding adhesion properties even after having been exposed to weathering.

A loss adhesion is manifested in incidents of flaking from aged (weather-exposed) refinishes under the action of stone chips. If the bodywork is cleaned by means of steam jet equipment, which is nowadays customary at numerous locations, minor flaking of this kind, caused by stone chipping, may then result in extensive delamination of the paint film. Particularly affected by this are highly chromatic colors, which have a high pigment content in the basecoat film.

This object has surprisingly been achieved by means of a polymer which is preparable by reacting (A) at least one polymer, preparable by reacting
 (a) dimer fatty acids with
 (b) at least one polyether of general structural formula (I)

where R is a $C_3$ to $C_6$ alkylene radical and n is selected accordingly such that said polyether has a number-average molecular weight of 450 to 2200 g/mol, components (a) and (b) are used in a molar ratio of 0.7/2 to 1.3/1.7, and the resulting polymer has a number-average molecular weight of 1500 to 5000 g/mol and an acid number <10 mg KOH/g, (B) at least one polyether of general structural formula (II)

where R is a $C_3$ to $C_6$ alkylene radical and n is selected accordingly such that said polyether has a number-average molecular weight of 1500 to 3000 g/mol, (C) at least one compound having at least one anionic group and/or at least one functional group capable of forming anions,
and having at least one, more particularly at least two, isocyanate-reactive functional groups, the compound being different from (A) and (B), (D) at least one polyisocyanate, and (E) optionally at least one monool or diol which is different from (A), (B) and (C), (F) at least one compound having more than two isocyanate-reactive functional groups, the compound being different from (A), (B) and (C), and optionally neutralizing the groups of component (C) that are capable of forming anions.

The condition whereby n is selected such that said polyether has a number-average molecular weight of 450 to 2200 g/mol may be illustrated as follows: Where, for example, R is a tetramethylene radical and the number-average molecular weight is to be 1000 g/mol, n is on average between 13 and 14.

Where references are indicated below, for the purpose of determining parameters, for example, the reference to the particular standard is to the version valid on the filing date of the present application.

The polymer of the invention is preferably a polyurethane.

Component (a):

The reaction product of the invention is prepared using at least one dimer fatty acid (a).

Dimer fatty acids (long known also as dimerized fatty acids or dimer acids) are, in general and particularly for the purposes of the present invention, mixtures prepared by oligomerization of unsaturated fatty acids. They are preparable, for example, by catalytic dimerization of unsaturated, plant fatty acids, with unsaturated $C_{12}$ to $C_{22}$ fatty acids in particular being used as starting materials. Linking proceeds primarily in accordance with the Diels-Alder type, and results, according to the number and position of the double bonds, in the fatty acids used to prepare the dimer fatty acids, in mixtures of primarily dimeric products, which have cycloaliphatic, linear aliphatic, branched aliphatic and also $C_6$ aromatic hydrocarbon groups between the carboxyl groups. Depending on the mechanism and/or on optional subsequent hydrogenation, the aliphatic radicals may be saturated or unsaturated, and the fraction of aromatic groups as well may vary. The radicals between the carboxylic acid groups then contain, for example, 24 to 44 carbon atoms. Used preferably for the preparation are fatty acids having carbon atoms, and so the dimeric product has 36 carbon atoms. The radicals which join the carboxyl groups of the dimer fatty acids preferably have no unsaturated bonds and no aromatic hydrocarbon radicals.

In the context of the present invention it is preferred therefore to use $C_{18}$ fatty acids in the production.

Particular preference is given to using linolenic, linoleic and/or oleic acid.

Depending on the reaction regime, the oligomerization referred to above produces mixtures comprising chiefly dimeric, but also trimeric molecules, and also monomeric molecules and other by-products. Purification is normally by distillation. Commercial dimer fatty acids generally contain at least 80% by weight of dimeric molecules, up to 19% by weight of trimeric molecules, and not more than 1% by weight of monomeric molecules and other by-products.

It is preferred for dimer fatty acids to be used which consist to an extent of at least 90% by weight, preferably at least 95% by weight, very preferably at least 98% by weight of dimeric fatty acid molecules.

In the context of the present invention it is preferred to use dimer fatty acids which consist to an extent of at least 90% by weight of dimeric molecules, less than 5% by weight of trimeric molecules, and less than 5% by weight of monomeric molecules and other by-products. It is particularly preferred to use dimer fatty acids which consist to an extent of 95% to 98% by weight of dimeric molecules, less than 5% by weight trimeric molecules, and less than 1% by weight of monomeric molecules and other by-products. Likewise particularly preferred is the use of dimer fatty acids which consist to an extent of at least 98% by weight of dimeric molecules, less than 1.5% by weight of trimeric molecules, and less than 0.5% by weight of monomeric molecules and other by-products. The fractions of monomeric, dimeric and trimeric molecules and of other by-products in the dimer fatty acids may be determined by means of gas chromatography (GC) for example. In this case the dimer fatty acids prior to GC analysis are converted by the boron trifluoride method into the corresponding methyl esters (compare DIN EN ISO 5509) and then analyzed by GC.

A fundamental identifier of "dimer fatty acids" in the context of the present invention, therefore, is that their preparation involves the oligomerization of unsaturated fatty acids. The principal products of this oligomerization, in other words to an extent preferably of at least 80% by weight, more preferably of at least 90% by weight, very preferably of at least 95% by weight, and more particularly of at least 98% by weight, are dimeric products. The fact that the oligomerization produces predominantly dimeric products, which therefore contain precisely two fatty acid molecules, justifies this designation, which is in any case commonplace. An alternative expression for the relevant term "dimer fatty acids", therefore, is "mixture comprising dimerized fatty acids".

The dimer fatty acids to be used may be obtained as commercial products. Examples which may be mentioned are Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1009, Empol 1061, and Empol 1062 from Cognis, and Unidyme 10 and Unidyme Ti from Arizona Chemical.

Component (b):

As component (b) at least one polyether is used of general structural formula (i)

where R is a $C_3$ to $C_6$ alkyl radical. The index n should be selected in each case such that said polyether has a number-average molecular weight of 450 to 2200 g/mol. More preferably it has a number-average molecular weight of 700 to 1400 g/mol, and very preferably of 800 to 1200 g/mol.

The number-average molecular weight for the purposes of the present invention is determined, unless otherwise specifically indicated, by means of vapor pressure osmosis. Measurement takes place using a vapor pressure osmometer (model 10.00 from Knauer) on concentration series of the component under investigation in toluene at 50° C., with benzophenone as calibration substance for the determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

In the polyether for use in accordance with the invention, all n radicals R may be the same. Similarly, however, it is also possible for different kinds of radicals R to be present. Preferably all of the radicals R are the same.

R is preferably a $C_3$ or $C_4$ alkylene radical. More preferably it is an isopropylene radical or a tetramethylene radical.

With very particular preference the polyether for use in accordance with the invention is polypropylene glycol or polytetrahydrofuran.

Component (A):

The preparation of the polymer (A) has no peculiarities. The esterification is accomplished typically by means of a water separator. In that case components (a) and (b) are used in a molar ratio of 0.7/2.3 to 1.3/1.7, preferably of 0.8/2.2 to 1.2/1.8, and very preferably 0.9/2.1 to 1.1/1.9. The reaction is discontinued when the polymer (A) has an acid number of <10 mg KOH/g. Preferably it has an acid number of <7.5 mg KOH/g, and very preferably of <5 mg KOH/q. The acid number here is determined by means of DIN EN ISO 2114.

The resulting polymer has a number-average molecular weight of 1500 to 5000 g/mol, preferably 2000 to 4500 g/mol, and very preferably 3000 to 4000 g/mol.

Particularly preferred embodiments are specified below:
a) In one particularly preferred embodiment of the polymer (A), the dimer fatty acid is prepared from linolenic, linoleic and/or oleic acid, consists to an extent of at least 98% by weight of dimeric molecules, less than 1.5% by weight of trimeric molecules, and less than 0.5% by weight of monomeric molecules and others.
b) In another particularly preferred embodiment of the polymer (A), the polyether for use is polypropylene glycol or polytetrahydrofuran and furthermore, has a number-average molecular weight of 800 to 1200 g/mol.
c) In another particularly preferred embodiment of the polymer (A), components (a) and (b) are used in a molar ratio of 0.9/2.1 to 1.1/1.9.
d) In another particularly preferred embodiment of the polymer (A), it has an acid number of <5 mg KOH/g.
e) In another particularly preferred embodiment the polymer (A), it has a number-average molecular weight of 3000 to 4000 g/mol.

In one especially preferred embodiment of the polymer (A), all of the features indicated under a) to e) are realized in combination.

Component (B):
As component (b) at least one polyether is used of general structural formula (II)

(II)

where R is a $C_3$ to $C_6$ alkyl radical. The index n should be selected in each case such that said polyether has a number-average molecular weight of 250 to 3000 g/mol. More preferably it has a number-average molecular weight of 1200 to 2400 g/mol, and very preferably of 1600 to 2200 g/mol.

In the polyether for use in accordance with the invention, all n radicals R may be the same. Similarly, however, it is also possible for different kinds of radicals R to be present. Preferably all of the radicals R are the same.

R is preferably a $C_3$ or $C_4$ alkylene radical. More preferably it is an isopropylene radical or a tetramethylene radical.

With very particular preference the polyether for use in accordance with the invention is polypropylene glycol or polytetrahydrofuran.

Component (C):
Used as component (C) are compounds having at least one anionic group and/or at least one functional group capable of forming anions,
and having at least one, more particularly at least two, isocyanate-reactive functional groups, component (C) being different from components (A) and (B).

Suitable isocyanates-reactive groups are, in particular, hydroxyl groups and primary and secondary amino groups, preferably hydroxyl groups.

Groups contemplated as groups capable of forming anions include, in particular, carboxyl groups and sulfonic acid groups. These groups may be neutralized prior to the reaction, in order to prevent reaction with the isocyanate groups.

As a compound which comprises at least two isocyanate-reactive groups and at least one group capable of forming anions, preference is given to using those selected from the group of dihydroxycarboxylic acids, dihydroxysulfonic acids, diaminocarboxylic acids and diaminosulfonic acids.

Particularly preferred are, for example, dihydroxy-propionic acid, dimethylolpropionic acid, dihydroxy-succinic acid, dihydroxybenzoic acid, alpha,delta-diaminovaleric acid, 3,4-diaminobenzoic acid, 2,4-diaminotoluene-5-sulfonic acid or 4,4'-diamino-diphenyl ether sulfonic acid, suitably. Of particularly preferred suitability are also the polyhydroxy acids obtainable by oxidizing monosaccharides, examples being gluconic acid, saccaric acid, mucic acid, glucuronic acid, and the like.

Dimethylolpropionic acid is employed with very particular preference.

Component (D):
Component (D) used is at least one polyisocyanate.
Polyisocyanates contemplated include in principle all of the customary and known polyisocyanates used within the paints field.

Examples of suitable polyisocyanates are isophorone diisocyanate (i.e., 5-isocyanato-1-isocyanatomethyl-1,3,3-trimethylcyclohexane), 5-isocyanato-1-(2-iso-cyanatoeth-1-yl)-1,3,3-trimethylcyclohexane, isocyanato-1-(3-isocyanatoprop-1-yl)-1,3,3-trimethyl-cyclohexane, isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, of the kind sold under the trade name DDI 1410 by Henkel and described in patents WO 97/49745 and WO 97/49747, more particularly 2-heptyl-3,4-bis(9-isocyanatononyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetramethylxylylene diisocyanate (i.e. 1,3-bis(2-isocyanatoprop-2-yl)benzene) or tolylene diisocyanate.

Use may also made of polyisocyanates containing isocyarlurate, biuret, allophanate, iminooxadiazine-dione, urethane, urea, carbodiimide and/or uretdione groups.

Polyisocyanates containing urethane groups are obtained, for example, by reaction of some of the isocyanate groups with polyols, such as trimethylol-propane and glycerol, for example. Preference is given to using the polyisocyanates described in detail above.

As polyisocyanates, preference is given to using saturated isocyanates; particularly preferred are the polyisocyanates selected from the group of isophorone diisocyanate and dicyclohexylmethane 4,4'-diisocyanate, with dicyclohexylmethane 4,4'-diisocyanate being especially preferred.

Component (E):

It is possible optionally to use at least one monool or diol for preparing the polymer of the invention, this monool or diol being different from components (A), (B) and (C).

Use may be made preferably of aliphatic diols having a molecular weight of 62 to 500 g/mol.

The diols may be cycloaliphatic, but preferably acyclic aliphatic compounds, which carry two hydroxyl groups as substituents.

Examples of suitable diols are ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclo-hexanedimethanol.

Component (F):

Component (F) is at least one compound having more than two isocyanate-reactive functional groups, with component (F) being different from components (A), (B) and (C).

Suitable compounds having more than two isocyanate-reactive functional groups may be polyols having more than two hydroxyl groups.

Examples of polyols having more than two hydroxyl groups are trimethylolethane, trimethylolpropane, trimethylolhexane, 1,2,4-butanetriol, pentaerythritol and dipentaerythritol.

Other suitable compounds having more than two isocyanate-reactive functional groups are those which carry both amine groups and hydroxyl groups.

A particularly suitable example of compounds which carry both amine groups and hydroxyl groups is diethanolamine.

Trimethylolpropane is employed with preference as component (F).

The Polymer

The polymer of the invention is preferably obtained by reacting in a first step the components (A), (B), (C), (B) and optionally (E) to form an intermediate containing isocyanate groups. The reaction of (A), (B), (C) and (B), and optionally (E), takes place in accordance with the well-known methods of polyurethane chemistry (cf., e.g., Kunststoff-Handbuch, volume 7: Polyurethane, edited by Dr. G. Oertel, Carl Hanser Verlag Munich-Vienna 1983), with the reaction of components (A), (B), (C), (D) and optionally (E) being carried out preferably not in stages out instead in one step.

The reaction can be carried out solventlessly, but is preferably carried out in solvents which are inert towards isocyanate groups and are miscible with water. Solvents used advantageously are those which in addition to the qualities described above are also good solvents for the polyurethanes prepared and can be easily removed from aqueous mixtures. Especially suitable solvents are acetone and methyl ethyl ketone.

The amounts of the components (A), (B), (C), (D) and optionally (E) are selected such that the equivalents ratio of the isocyanate groups of component (D) and optionally (E) to the sum of the OH groups of components (A), (B), (C) and optionally (E) and also the reactive groups of component (C) is 2:1 to 1.05:1, preferably 1.5:1 to 1.1:1.

The acid number of the polymer of the invention may be controlled through selection and amount of component (C). The amount of groups capable of forming anions is preferably selected such that the polymer of the invention has an acid number of <50 mg KOH/g, preferably 10 to 25 mg KOH/g.

Unless otherwise indicated, the acid number indicates the amount of potassium hydroxide in mg which is consumed in the neutralization of 1 g of the compound in question (DIN EN ISO 2114).

The reaction of the isocyanate-group-containing intermediate formed from (A), (B), (C), (D) and optionally (E) with a compound having more than two isocyanate-reactive functional groups (F) in a second step is controlled preferably by the stoichiometry of the compounds used, in such a way that there are instances of chain extension and possibly also of branching of the polymer molecules. With this reaction it is necessary carefully to ensure that no crosslinked products are obtained (cf., e.g., U.S. Pat. No. 4,423,179), i.e., that the molecular weight of the polyurethane resin synthesized from components (A) to (F) is not above 50 000 (number average). On the other hand, the molecular weight ought also not to be lower than 5000 (number average).

The amount of component (F) is selected such that the equivalents ratio of the OH groups of component (F) to the isocyanate groups of the intermediate is 0.5:1 to 4:1, preferably 0.75:1 to 3.5:1. Account must also be taken, when selecting the amount of component (F), of the molecular weight of the intermediate and the desired molecular weight of the polyurethane resin. If in fact the molecular weight of the intermediate is low and a significant increase in molecular weight is desired, the amount of component (F) used is lower than in the case of a high molecular weight of the intermediate, for which component (F) serves primarily to scavenge the free isocyanate groups and hence to terminate the reaction.

Apart from the preferably staged synthesis of the polyurethane resin, as described, from components (A) to (F), a simultaneous reaction of all of components (A) to (F) is also possible, although in that case it must carefully be ensured that noncrosslinked polyurethanes are obtained.

In analogy to the staged synthesis, for the simultaneous reaction of components (A) to (F) as well the amount of the individual components (A) to (F) must be selected such that the resultant polyurethane resin has a molecular weight of 5000 to 50 000 (number average).

In general the amounts of components (A) to (F) are selected such that the equivalents ratio of the NCO groups of component (D) and optionally (E) to the sum of the groups of components (A), (B), (C) and optionally (E) that are reactive towards NCO groups, and also the reactive groups of component (C), is 2:1 to 1:2, preferably 1.5:1 to 1:1.5.

The reaction product thus obtained may still have free isocyanate groups, which are hydrolyzed when the reaction product is dispersed in water. For this purpose the reaction product can be transferred into an aqueous phase.

This may be done, for example, by dispersing the reaction mixture in water and removing, by distillation, the organic solvent fractions that boil in general at less than 100° C. Alternatively, water may be added to the reaction mixture, and the organic solvent fraction that boils in general at less than 100° C. can be removed by distillation.

By aqueous phase is meant water, which may also still include organic solvents. Examples of solvents which may be present in the water include heterocyclic, aliphatic or aromatic hydrocarbons, mono- or polyfunctional alcohols, ethers, esters and ketones, such as N-methylpyrrolidone, toluene, for example; xylene, butanol, ethyl- and butylglycol and also their acetates, butyldiglycol, ethylene glycol dibutyl ether, ethylene glycol diethyl ether, diethylene glycol dimethyl ether, cyclohexanone, methyl ethyl ketone, acetone, isophorone or mixtures thereof.

Optionally, as for example if component (C) contains groups capable of forming anions, the groups that are capable of forming anions may be neutralized before the reaction mixture is transferred into the aqueous phase, in order to increase the solubility of the polymer in water. A neutralization step of this kind that may be necessary may take place either before or after the addition of component (F). The neutralization takes place preferably after the addition of component (F).

For the optionally required neutralization of the anionic groups, tertiary amines may be used, such as, for example, trimethylamine, triethylamine, dimethyl-aniline, diethylaniline, triphenylamine and the like. The neutralization may alternatively be carried out with other known organic and inorganic bases, such as sodium hydroxide and potassium hydroxide and ammonia, for example.

The neutralization may alternatively also be carried out through the use of amines which carry further groups reactive with isocyanate groups. In this case the compounds may be incorporated into the chain of the polymer.

Water can be added to adjust the solids content of the polymer dispersion obtained following transfer into the aqueous phase. The solids content is set preferably at 20% to 60% by weight, more preferably 25% to 40% by weight, very preferably at 30% to 38% by weight.

For the determination of the solids content, a 1 g sample of the substance under analysis is applied to a metal dish having a diameter of 6 cm. Using an upwardly bent paperclip, the material is distributed, and in the case of highly viscous materials 1 ml of a suitable low-boiling solvent (e.g., butanol) is also added. The paperclip used remains on the metal dish. In a forced-air oven, the material is then dried at 130° C. for an hour. The resulting weight in relation to the initial mass, following subtraction of the empty weight of the dish and of the paperclip, then gives the solids content of the resin. Duplicate determinations are always carried out.

The Basecoat Material of the Invention

The present invention further relates to a pigmented aqueous basecoat material which comprises at least one polymer of the invention.

A basecoat material is a color-imparting intermediate coating material which is used in motor vehicle finishing and general industrial coating. It is applied generally to a metallic or plastics substrate which has been pretreated with a primer or primer-surfacer, and occasionally is even applied directly to the plastics substrate. Substrates used may also include existing finishes, which may also need to be pretreated (by sanding, for example). It is now entirely customary for more than one basecoat film to be applied. In such a case, accordingly, a first basecoat film constitutes the substrate for a second. In order to protect basecoat film against environmental effects, in particular, at least one additional clearcoat film is applied over it.

The sum total of the weight-percentage fractions, based on the total weight of the pigmented aqueous basecoat material, of all of the polymers according to the invention is preferably 0.5% to 30% by weight, more preferably 1% to 20% by weight, and very preferably 1.5% to 15% by weight or even 2% 12% by weight.

Where the amount of the polymer of the invention is below 0.5% by weight, it may be that no improvement in adhesion is achieved any longer. Where the amount is more than 30% by weight, there may under certain circumstances be disadvantages, such as increased tackiness of the dried basecoat material film, for example.

In one preferred embodiment, the sum total of the weight-percentage fractions of all of the polymers according to the invention is 0.5% to 30% by weight, based on the total weight of the pigmented aqueous basecoat material. Where preferred embodiments of the polymers of the invention are used, the sum total of the weight-percentage fractions of all preferred embodiments of the polymers of the invention is preferably likewise 0.5% to 30% by weight, based on the total weight of the pigmented aqueous basecoat material. With particular preference, the pigmented aqueous basecoat material comprises exclusively, as polymers of the invention, preferred embodiments of the polymers of the invention.

In one preferred embodiment, the sum total of the weight-percentage fractions of all of the polymers according to the invention is 1% to 20% by weight, based on the total weight of the pigmented aqueous basecoat material. Where preferred embodiments of the polymers of the invention are used, the sum total of the weight-percentage fractions of all preferred embodiments of the polymers of the invention is preferably likewise 1% to 20% by weight, based on the total weight of the pigmented aqueous basecoat material. With particular preference, the pigmented aqueous basecoat material comprises exclusively, as polymers of the invention, preferred embodiments of the polymers of the invention.

In one especially preferred embodiment, the sum total of the weight-percentage fractions of all of the polymers according to the invention is 1.5% to 15% by weight, based on the total weight of the pigmented aqueous basecoat material. Where preferred embodiments of the polymers of the invention are used, the sum total of the weight-percentage fractions of all preferred embodiments of the polymers of the invention is preferably likewise 1.5% to 15% by weight, based on the total weight of the pigmented aqueous basecoat material. With particular preference, the pigmented aqueous basecoat material comprises exclusively, as polymers of the invention, preferred embodiments of the polymers of the invention.

In one likewise especially preferred embodiment, the sum total of the weight-percentage fractions of all of the polymers according to the invention is 2% to 12% by weight, based on the total weight of the pigmented aqueous basecoat material. Where preferred embodiments of the polymers of the invention are used, the sum total of the weight-percentage fractions of all preferred embodiments of the polymers of the invention is preferably likewise 2% to 12% by weight, based on the total weight of the pigmented aqueous basecoat material. With particular preference, the pigmented aqueous basecoat material comprises exclusively, as polymers of the invention, preferred embodiments of the polymers of the invention.

Examples of embodiments of the reaction products of the invention that are preferred in this context include the following particularly preferred embodiments:

a) In one particularly preferred embodiment of the reaction product of the invention, the dimer fatty acid is prepared from linolenic, linoleic and/or oleic acid and consists to an extent of at least 98% by weight of dimeric molecules, less than 1.5% by weight of trimeric molecules, and less than 0.5% by weight of monomeric molecules and other by-products.

b) In another particularly preferred embodiment of the polymer of the invention, the polyether (I) for use in accordance with the invention is polypropylene glycol or polytetrahydrofuran and, furthermore, has a number-average molecular weight of 800 to 1200 g/mol.

c) In another particularly preferred embodiment of the polymer of the invention, the polyether (II) for use in accordance with the invention is polypropylene glycol or polytetrahydrofuran and, furthermore, has a number-average molecular weight of 1800 to 2200 g/mol.

d) In another particularly preferred embodiment of the polymer of the invention, components (a) and (b) are used in a molar ratio of 0.9/2.1 to 1.1/1.9.

e) In another particularly preferred embodiment of the polymer of the invention, it has an acid number of <50 mg KOH/g.

f) In another particularly preferred embodiment of the polymer of the invention, it has number-average molecular weight of 5000 to 50 000 g/mol.

As a further example of embodiments of the polymers of the invention that are preferred in this context, mention may be made of that embodiment in which all of the features indicated under a) to f) are realized in combination.

The basecoat materials used in accordance with the invention comprise color and/or effect pigments. Such color pigments and effect pigments are known to the skilled person and are described for example in Römpp-Lexikon Locke und Druckfarben, Georg Thieme Verlag, Stuttgart, N.Y., 1998, pages 176 and 451. The fraction of the pigments may be situated for example in the range from 1% to 40% by weight, preferably 2% to 30% by weight, more preferably 3% to 25% by weight, based on the total weight of the pigmented aqueous basecoat material.

For the purposes of the present invention preference is given to basecoat materials which as binders comprise polymers curable physically, thermally or both thermally and with actinic radiation. Binders for the purposes of the present invention are understood, in accordance with the relevant DIN EN ISO 4618 (German version), to comprise the nonvolatile fraction of a coating material minus pigments and fillers. Specific binders, accordingly, are also, for example, typical coatings additives, the reaction product of the invention, or typical crosslinking agents described later on below, despite the fact that the expression below is used primarily in relation to particular polymers—particular polyurethane resins, for example—that are curable physically, thermally or both thermally and with actinic radiation.

Besides the polymer of the invention, the pigmented aqueous basecoat materials of the invention comprise with particular preference at least one further polyurethane resin (Z) which is different from the polymer of the invention, as binder.

Coating materials comprising polyurethane resins may likewise be typically cured physically, thermally, or both thermally and with actinic radiation.

In the context of the present invention, the term "physical curing" denotes the formation of a film by release of solvent from polymer solutions or polymer dispersions. Typically, no crosslinking agents are necessary for this purpose In the context of the present invention, the term "thermal curing" denotes the heat-initiated crosslinking of a coating film where in the parent coating material either a separate crosslinking agent or else self-crosslinking binders are employed. The crosslinking agent comprises reactive functional groups which are complementary to the reactive functional groups present in the binders. This is typically referred to by those in the art as external crosslinking. Where the complementary reactive functional groups or autoreactive functional groups, i.e., groups which react with groups of the same kind, are already present in the binder molecules, the binders are self-crosslinking. Examples of suitable complementary reactive functional groups and autoreactive functional groups are known from German patent application DE 199 30 665 A1, page 7, line 28 to page 9, line 24.

In the context of the present invention, actinic radiation means electromagnetic radiation such as near infrared (NIR), UV radiation, more particularly UV radiation, and particulate radiation such as electron radiation. Curing by UV radiation is typically initiated by radical or cationic photoinitiators.

Where thermal curing and curing with actinic light are employed jointly, the term "dual cure" is also used.

In the present invention, preferred basecoat materials are those which are curable physically and those which are curable thermally or both thermally and with actinic radiation, in other words by "dual cure".

Preferred thermally curing basecoat materials are those which comprise a polyurethane resin binder and as crosslinking agent an amino resin or a blocked or nonblocked polyisocyanate, preferably an amino resin. Among the amino resins, melamine resins are preferred.

The sum of the weight percentage fractions, based on the total weight of the pigmented aqueous basecoat material, of all crosslinking agents, preferably amino resins and/or blocked and/or nonblocked polyisocyanate, especially preferably melamine resins, is preferably 1% to 20% by weight, more preferably 1.5% to 17.5% by weight and very preferably 2% to 15% by weight or even 2.5% to 10% by weight.

The further polyurethane resin (Z) preferably present may be ionically and/or nonionically hydrophilically stabilized. In preferred embodiments of the present invention, the polyurethane resin is ionically hydrophilically stabilized. The preferred polyurethane resins are linear or contain branches. The resin may be a polyurethane resin in whose presence olefinically unsaturated monomers have been polymerized. The polyurethane resin here may be present in addition to the polymer originating from the polymerization of the olefinically unsaturated monomers, without these monomers being bonded covalently to one another. Also possible, however, is for the polyurethane resin to be bonded covalently to the polymer originating from the polymerization of the olefinically unsaturated monomers. The olefinically unsaturated monomers are preferably monomers containing acrylate and/or methacrylate groups. It is likewise preferred for the monomers containing acrylate and/or methacrylate groups to be used in combination with further olefinically unsaturated compounds that do not contain any acrylate or methacrylate groups. Olefinically unsaturated monomers attached to the polyurethane resin are more preferably monomers containing acrylate groups or methacrylate groups, producing polyurethane (meth)acrylates. With very particular preference the polyurethane resin is a polyurethane (meth)acrylate. The polyurethane resin preferably present is curable physically, thermally, or thermally and with actinic radiation. More particularly it is curable thermally or both thermally and with actinic radiation. With particular preference the polyurethane resin comprises reactive functional groups through which external crosslinking is possible.

Suitable saturated or unsaturated polyurethane resins are described for example in German patent application DE 199 14 896 A1, column 1, lines 29 to 49 and column 4, line 23 to column 11, line 5

German patent application DE 199 48 004 A1, page 4, line 19 to page 13, line 48;

European patent application EP 0 228 003 A1, page 3, line 24 to page 5, line

European patent application EP 0 634 431 A1, page 3, line 38 to page 8, line 9; or international patent application WO 92/15405, page 2, line 35 to page 10, line 32.

For the preparation of the polyurethane resin it is preferred to make use of the aliphatic, cycloaliphatic, aliphatic-cycloaliphatic, aromatic, aliphatic-aromatic and/or cycloaliphatic-aromatic polyisocyanates known to the skilled person.

As an alcohol component for preparing the polyurethane resins it is preferred to use the saturated and unsaturated, relatively high molecular mass and low molecular mass, polyols and also, optionally, monoalcohols in minor amounts, that are known to the skilled person. Low molecular mass polyols used are more particularly diols and, in minor amounts, triols for the purpose of introducing branches. Examples of suitable polyols of relatively high molecular mass are saturated or olefinically unsaturated polyester polyols and/or polyether polyols. Relatively high molecular mass polyols used more particularly are polyester polyols, especially those having a number-average molecular weight of 400 to 5000 g/mol.

For the hydrophilic stabilization and/or for increasing the dispersibility in aqueous medium, the polyurethane resin preferably present may comprise particular ionic groups and/or groups which can be converted into ionic groups (potentially ionic groups). Such polyurethane resins are referred to in the context of the present invention as ionically hydrophilically stabilized polyurethane resins. Likewise present may be nonionic hydrophilically modifying groups. Preference is given, however, to the ionically hydrophilically stabilized polyurethanes. More specifically the modifying groups are functional groups which can be converted into cations by neutralizing agents and/or quaternizing agents and/or cationic groups (cationic modification)

or functional groups which can be converted into anions by neutralizing agents, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted into cationic groups by neutralizing agents and/or quaternizing agents). Also noteworthy are the cationic groups prepared from the aforementioned functional groups using neutralizing agents and/or quaternizing agents known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic, sulfonic and/or phosphonic acid groups, more particularly carboxylic acid groups (functional groups which can be converted into anionic groups by neutralizing agents), and also anionic groups prepared from the aforementioned functional groups using neutralizing agent known to the skilled person, such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications may be introduced into the polyurethane resin by monomers which comprise the (potentially) ionic groups. The nonionic modifications are introduced, for example, through the incorporation poly(ethylene) oxide polymers as side groups or terminal groups of the polyurethane molecules. The hydrophilic modifications are introduced, for example, via compounds which comprise at least one group that is reactive toward isocyanate groups, preferably at least one hydroxyl group. For introducing the ionic modification it is possible to use monomers which as well as the modifying groups comprise at least one hydroxyl group. For introducing the nonionic modifications it is preferred to use the alkoxypoly(oxyalkylene) alcohols and/or polyetherdiols that are known to the skilled person.

The polyurethane resin may be a graft polymer. More particularly it is a polyurethane resin grafted using olefinically unsaturated compounds, preferably olefinically unsaturated monomers. In this case, therefore, the polyurethane is grafted, for example, with side groups and/or side chains that are based on olefinically unsaturated monomers. The groups or chains in question are more particularly side chains based on poly(meth)acrylates. Poly(meth)acrylates in the context of the present invention are polymers or polymeric radicals which comprise monomers containing acrylate and/or methacrylate groups, and preferably consist of monomers containing acrylate and/or methacrylate groups. Side chains based on poly(meth)acrylates are side chains which are constructed during graft polymerization using monomers containing (meth)acrylate groups. In this case, during the graft polymerization, preferably more than 50 mol %, more particularly more than 75 mol %, more particularly 100 mol % of monomers containing (meth)acrylate groups are used, based on the total amount of the monomers used in the graft polymerization.

The side chains described are introduced into the polymer preferably after the preparation of a primary polyurethane resin dispersion. In this case the polyurethane resin present in the primary dispersion may comprise pendant and/or terminal olefinically unsaturated groups, via which the graft polymerization with the olefinically unsaturated compounds then proceeds. The polyurethane resin for grafting may therefore be an unsaturated polyurethane resin (A). The graft polymerization is in that case a radical polymerization of olefinically unsaturated reactants. Also possible, for example, is for the olefinically unsaturated compounds used for the graft polymerization to comprise at least one hydroxyl group. In that case it is also possible initially for there to be attachment of the olefinically unsaturated compounds via these hydroxyl groups, by reaction with free isocyanate groups of the polyurethane resin. This attachment occurs instead of or in addition to the radical reaction of the olefinically unsaturated compounds with any pendant and/or terminal olefinically unsaturated groups that may be present in the polyurethane resin. This is then followed, again, by the graft polymerization via radical polymerization as described earlier on above. In each case, polyurethane resins are obtained that are grafted with olefinically unsaturated compounds, preferably olefinically unsaturated monomers.

As olefinically unsaturated compounds with which the polyurethane resin is preferably grafted it is possible to use virtually all radically polymerizable, olefinically unsaturated and organic monomers that are available to the skilled person for these purposes. A number of preferred monomer classes may be cited as examples:

hydroxyalkyl esters of (meth)acrylic acid or of other alpha, beta-ethylenically unsaturated carboxylic acids, (meth)acrylic acid alkyl esters and/or cycloalkyl esters having up to 20 carbon atoms in the alkyl radical, ethylenically unsaturated monomers, comprising at least one acid group, more particularly precisely one carboxyl group, such as (meth)acrylic acid, vinyl esters of monocarboxylic acids branched in alpha position and having 5 to 18 carbon atoms, reaction products of (meth)acrylic acid with the glycidyl ester of a monocarboxylic acid branched in alpha position and having 5 to 18 carbon atoms, other ethylenically unsaturated monomers such as olefins (for example ethylene), (meth)acrylamides, vinvlaromatic hydrocarbons (styrene for example), and vinyl compounds such as vinyl chloride and/or vinyl ethers such as ethyl vinyl ethers.

Preference is given to using monomers containing (meth)acrylate groups, and so the grafted-on side chains are poly(meth)acrylate-based side chains.

The pendant and/or terminal olefinically unsaturated groups in the polyurethane resin, via which graft polymerization with the olefinically unsaturated compounds is able to proceed, are introduced into the polyurethane resin preferably by way of certain monomers which as well as an olefinically unsaturated group also comprise, for example, at least one group reactive toward isocyanate groups. Hydroxyl groups and also primary and secondary amino groups are preferred. Hydroxyl groups are especially preferred.

Of course, the monomers described by which the pendant and/or terminal olefinically unsaturated groups may be introduced into the polyurethane resin may also be employed without the polyurethane resin being additionally grafted thereafter with olefinically unsaturated compounds. It is preferred, however, for the polyurethane resin to be grafted with olefinically unsaturated compounds.

The polyurethane resin (Z) is prepared by the typical methods of polymer chemistry. This means, for example, the polymerization of polyisocyanates and polyols to polyurethanes, and the graft polymerization that optionally then follows with olefinically unsaturated compounds. These techniques are known to the skilled person and may be adapted individually. Exemplary preparation processes and reaction conditions are found in European patent EP 0 521 928 B1, page 2, line 57 to page 8, line 16.

The polyurethane resin preferably present possesses preferably a number-average molecular weight of 200 to 30 000 g/mol, more preferably of 2000 to 20 000 g/mol. It additionally possesses, for example, a hydroxyl number of 0 to 250 mg KOH/g, but more particularly of 20 to 150 mg KOH/g. The acid number of the polyurethane resin is preferably 5 to 200 mg KOH/g, more particularly 10 to mg KOH/g. The hydroxyl number is determined in accordance with DIN 53240, the acid number in accordance with DIN EN ISO 2114.

By film-forming solids is meant the nonvolatile weight fraction of the basecoat material, excluding pigments and any fillers. The film-forming solids can be determined as follows: A sample of the pigmented aqueous basecoat material (approximately 1 g) is admixed with 50 to 100 times the amount of tetrahydrofuran and then stirred for about 10 minutes. The insoluble pigments and any fillers are then removed by filtration, and the residue is rinsed with a little THF, after which the THF is removed from the resultant filtrate on a rotary evaporator. The filtrate residue is dried at 120° C. for two hours and the film-forming solids that results in this drying operation is weighed.

The amount of film-forming solids in the basecoat material of the invention is preferably 10.5%-12.0% by weight.

Preferably, moreover, a thickener is present. Suitable thickeners are inorganic thickeners from the group of the phyllosilicates. Besides the inorganic thickeners, however, it is also possible to use one or more organic thickeners. These organic thickeners are preferably selected from the group consisting of (meth)acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. The thickeners used are different from the binders used.

The pigmented aqueous basecoat material may also, furthermore, comprise at least one additive. Examples of such additives are salts which can be decomposed thermally without residue or substantially without residue, resins as binders, which are curable physically, thermally and/or with actinic radiation and are different from polyurethane resins, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical-polymerization initiators, adhesion promoters, flow control agents, film-forming assistants, sag control agents (SCAs), flame retardants, corrosion inhibitors, waxes, siccatives, biocides, and matting agents.

Suitable additives of the aforementioned kind are known for example from

German patent application DE 199 48 004 A1, page 14, line 4, to page 17, line 5, German patent DE 100 43 405 C1, column 5, paragraphs [0031] to [0033].

They are used in the customary and known amounts.

The solids content of the basecoat materials used in accordance with the invention may vary according to the requirements of the individual case. First and foremost the solids content is guided by the viscosity that is required for application, more particularly spray application, and so it may be set by the skilled person on the basis of his or her general art knowledge, with the assistance where appropriate of a few rangefinding tests.

The solids content of the basecoat materials is preferably 5% to 70%, more preferably 8% to 60%, and with particular preference 12% to 55%, by weight.

By solids content is meant that weight fraction which remains as a residue on evaporation under defined conditions. In the present specification, the solids content of the coating substance has been determined in accordance with DIN EN ISO 3251. For this the coating material is evaporated at 130° C. for 60 minutes.

The basecoat materials used in accordance with the invention can be prepared using the mixing methods and mixing assemblies that are customary and known for producing basecoat materials.

The Method of the Invention and the Multicoat Paint System of the Invention

A further aspect of the present invention is a method for producing a multicoat paint system by applying a pigmented aqueous basecoat material to substrate, forming a polymer film from the coating material applied in stage (1), applying a clearcoat material to the resulting basecoat film, and subsequently curing the basecoat film together with the clearcoat film, which is characterized in that in stage (1) a pigmented aqueous basecoat material is used that comprises the polymer of the invention. All details given above for the polymer of the invention and for the pigmented aqueous basecoat material are also applicable to the inventive use. This applies additionally, not least, to all preferred, more preferred, and very preferred features.

The said method is used preferably for producing multicoat color paint systems, multicoat effect paint systems, and multicoat color and effect paint systems.

The pigmented aqueous basecoat material used in accordance with the invention is applied typically to metallic or plastics substrates which have been pretreated with a primer or primer-surfacer. The said basecoat material may optionally also be applied directly to the plastics substrate.

If a metallic substrate is to be coated, it is preferably also coated with an electrodeposition coat before the primer or primer-surfacer is applied.

If plastics substrate is being coated, is preferably also pretreated before the primer or primer-surfacer is applied. The techniques most frequently employed for such pretreatment are flaming, plasma treatment, and corona discharge. It is preferred to use flaming.

The application of the pigmented aqueous basecoat material used in accordance with the invention to a metallic substrate may take place in the film thicknesses that are customary in the context of the motor vehicle industry, in the range from, for example, 5 to 100 micrometers, preferably 5 to 60 micrometers. This is done by employing spray application methods, such as, for example, compressed air spraying, airless spraying, high speed rotation, or electrostatic spray application (ESTA), alone or in conjunction with hot spray application such as hot air spraying, for example.

After the pigmented aqueous basecoat material has been applied, it may be dried by known techniques. For example, 1-component basecoat materials may be flashed at room temperature for 1 to 60 minutes and subsequently dried preferably at optionally slightly elevated temperatures of 30 to 80° C. Flashing and drying for the purposes of the present invention mean the evaporation of organic solvents and/or water, whereby the coating material becomes drier, but is not yet cured, or there is as yet no formation of a fully crosslinked coating film.

A commercially customary clearcoat material is then applied likewise by common techniques, the film thicknesses again being situated within the customary ranges, such as 5 to 100 micrometers, for example.

Following the application of the clearcoat material, it may be flashed at room temperature for 1 to 60 minutes, for example, and optionally dried. The clearcoat material is then cured together with the pigmented basecoat material applied. Here, for example, crosslinking reactions take place, produce a multicoat color and/or effect paint system of the invention on a substrate. Curing takes place preferably thermally at temperatures from 60 to 200° C. Thermally curing basecoat materials are preferably those which comprise additionally a polyurethane resin binder and as crosslinking agent an amino resin or a blocked or nonblocked polyisocyanate, preferably an amino resin. Among the amino resins, melamine resins are preferred.

Plastics substrates are coated basically in the same way as for metallic substrates. Here, however, curing takes place generally at much lower temperatures, of 30 to 90° C. It is therefore preferred to use two-component clearcoat materials. In addition, it is preferred to use basecoat materials which comprise a polyurethane resin binder but no crosslinker.

With the aid of the method of the invention it is possible to coat metallic and nonmetallic substrates, especially plastics substrates, preferably motor vehicle bodies or parts thereof.

The method of the invention can be used, in addition, for the double coating in OEM finishing. This means that a substrate which has been coated using the method of the invention is painted a second time, again using the method of the invention.

The invention further relates to multicoat paint systems which are producible by the method described above. These multicoat paint systems will be referred to below as multicoat paint systems of the invention.

All of the abovementioned details relating to the polymer of the invention, to the pigmented aqueous basecoat material, and to the method of the invention also apply correspondingly in respect of the said multicoat paint system. This also applies not least in respect of all preferred, more preferred, and very preferred features.

The multicoat paint systems of the invention are preferably multicoat color paint systems, effect paint systems, and color and effect paint systems.

A further aspect of the invention relates to the method of the invention where said substrate from stage (1) is a multicoat paint system that has defect areas.

The method of the invention is suitable, accordingly, for remedying defect areas on multicoat paint systems. Defect areas or film defects are, generally, disruptions on and in the coating, usually named according to their shape or their appearance. The skilled person knows a multiplicity of possible kinds of such film defects. They are described for example in Römpp-Lexikon Lacke und Druckfarben, Georg Thieme Verlag, Stuttgart, N.Y., 1998, page 235, "Filmfehler" ["Film defects"].

The multicoat paint systems produced using the method of the invention may likewise exhibit such defect areas. In one preferred embodiment of the method of the invention, therefore, the substrate from stage (1) is a multicoat paint system of the invention that exhibits defect areas.

These multicoat paint systems are produced preferably on motor vehicle bodies or parts thereof, by means of the above-designated method of the invention, as part of automotive OEM finishing. Where such defect areas appear directly after OEM finishing, they are remedied directly. Hence the term OEM automotive refinish is also used. Where only small defect areas require remedy, a repair is carried out not to the whole body (double coating) but only to the "spot", as it is called. This operation is called "spot repair". Particularly preferable, therefore, is the use of the method of the invention for remedying defect areas on multicoat paint systems of the invention in OEM automotive refinish.

In this case the aqueous basecoat material used in stage (1) of the method of the invention to remedy defect areas can be the same as that used in the method of the invention for producing the multicoat paint system of the invention. The basecoat material used may, however, also be part of a mixer system for the reproduction of shades which are frequently employed in the automotive refinish segment.

The details given above concerning the polymer of the invention and concerning the aqueous pigmented basecoat material also apply in respect of the as-discussed use of the method of the invention for remedying defect areas on a multicoat paint system. This applies in particular also for all preferred, more preferred, and very preferred features specified. It is preferred, moreover, for the multicoat paint systems of the invention that are to be remedied to be multicoat color paint systems, effect paint systems, and color and effect paint systems.

The above-described defect areas on the multicoat paint system the invention can be remedied using the method of the invention described above. For this purpose, the surface of the multicoat paint system that is to be remedied may initially be sanded. This is followed by application of the pigmented aqueous basecoat material to the defect area in the original finish, by pneumatic spraying. Following the application of the pigmented aqueous basecoat material, it can be dried by known techniques. For example, the basecoat material can be dried at room temperature for 1 to 60 minutes, and can subsequently be dried at slightly elevated temperatures, if desired, of 30 to 80° C. Flashing and drying in the context of the present invention mean the evaporation of organic solvents and/or water, but not so as to fully cure the coating material.

Subsequently a commercial clearcoat material is applied, by techniques that are likewise commonplace. Following the application of the clearcoat material, it can be flashed at room temperature for 1 to 60 minutes, for example, and optionally dried. The clearcoat material is then cured together with the applied pigmented basecoat material.

In the case of what is known as low-temperature baking, curing takes place preferably at temperatures from 20 to 90° C. Here it is preferred to use two-component clearcoat materials.

In the case of what is called high-temperature baking, curing is accomplished preferably at temperatures from 130 to 150° C. Here, both one-component and two-component clearcoat materials are used.

A further aspect of the present invention is the use the polymer of the invention in pigmented aqueous basecoat materials for the purpose of promoting adhesion. By this is meant the promotion of adhesion with respect to those pigmented aqueous basecoat materials which do not contain any polymer of the invention.

The polymer of the invention can be used for promoting adhesion in the finishing of metallic and plastics substrates. It can also be used in automotive refinish. By automotive refinish is meant both the OEM automotive refinish and the automotive refinish of the kind which takes place in a workshop, for example.

Where said pigmented aqueous basecoat materials are used in the finishing of metallic and plastics substrates, the use of the polymer of the invention results more particularly in an improvement of the adhesion between the basecoat film and the clearcoat film immediately adjacent to it. The polymer of the invention is therefore used preferably for promoting adhesion between basecoat film and clearcoat film in the coating of metallic and plastics substrates.

Where the said pigmented aqueous basecoat materials are used in automotive refinish, the use of the polymer of the invention results more particularly in an improvement in adhesion between basecoat material and original finish. The polymer of the invention is therefore also used with preference for promoting the adhesion between basecoat and original finish in automotive refinishing, more preferably in OEM automotive refinishing.

A loss of adhesion is manifested in incidents of flaking from aged (weather-exposed) refinishes under the action of stone chips. If the bodywork is cleaned by means of steam jet equipment, which is nowadays customary at numerous locations, minor flaking of this kind, caused by stone chipping, may then result in extensive delamination of the paint film. Particularly affected by this are highly chromatic colors, which have a high pigment content in the basecoat film.

The invention is elucidated below, using examples.

EXAMPLES

Specification of Certain Components and Measurement Methods Employed

Dimer Fatty Acid:

The dimer fatty acid used contains less than 1.5% by weight of trimeric molecules, 98% by weight of dimeric molecules, and less than 0.3% by weight of fatty acid (monomer). It is prepared on the basis of linolenic, linoleic, and oleic acids (Pripol™ 1012-LQ-(GD) (Croda)).

Determination of the Number-Average Molecular Weight:

The number-average molecular weight was determined by means of vapor pressure osmosis. Measurement took place using a vapor pressure osmometer (model 10.00 from Knauer) on concentration series of the component under investigation in toluene at 50° C., with benzophenone as calibration substance for the determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preparation of the Polyester Prepolymer PP1

In a 4 l stainless steel reactor, equipped with anchor stirrer, thermometer, condenser, thermometer for overhead temperature measurement, and water separator, 2 mol of polyTHF1000, 579.3 g of dimerized fatty acid (Pripol® 1012, Uniqema), (1 mol) and 51 g of cyclohexane are heated to 100° C. Heating is continued slowly until the onset of condensation. At a maximum overhead temperature of 85° C., heating is then continued gradually up to 220° C. The progress of the reaction is monitored via determination of the acid number. When an acid number of ≤3 mg KOH/g has been reached, remaining cyclohexane is removed by distillation under vacuum. This gives a viscous resin, having a viscosity of 4500-5800 mPas (measured at 23° C. using a rotary viscometer from Brookfield, model CAP 2000+, spindle 3, shear rate: 1333 s$^{-1}$).

The calculated molecular weight of the polyester prepolymer is 2399 g/mol, and it has an OH functionality of 2.

Experimental Data:

Mn: 2200 g/mol

Viscosity: 5549 mPas (measured at 23° C. with Brookfield CAP 2000+ rotary viscometer, spindle 3, shear rate: 1333s$^{-1}$)

Preparation of the Polyester Prepolymer PP2

The linear polyester polyol PP2 was prepared in the same way as for PP1 from dimerized fatty acid (Pripol® 1012, Uniqema), isophthalic acid (BP Chemicals) and hexane-1,6-diol (BASF SE) (weight ratio of the starting materials: dimeric fatty acid to isophthalic acid to hexane-1,6-diol=54.00:30.02:15.98) and had a hydroxyl number of 73 mg KOH/g solids and a (calculated) number-average molecular weight of 1379 g/mol with an OH functionality of 2.0.

Experimental Data:

Mn: 1250 g/mol

Viscosity: 632 mPas (measured at 23° C. with a Brookfield CAP 2000+ rotary viscometer, spindle 3, shear rate: 10 000 s$^{-1}$)

Preparation of the Polyester Prepolymer PP3

In the same way as for PP1, a linear polyester prepolymer is prepared. Hexanediol is now replaced on a molar basis for an equimolar mixture of neopentyl glycol and hexanediol.

This gives a linear polyester resin having a number-average molecular weight of 1349 g/mol with an OH functionality of 2.0.

Experimental Data:

Mn: 1320 g/mol

Viscosity: 430 mPas (measured at 23° C. with a Brookfield CAP 2000+ rotary viscometer, spindle 3, shear rate: 10 000 s$^{-1}$)

Preparation of the Polyurethanes PU1 to PU4

In a 4 l stainless steel reactor, equipped with stirrer, reflux condenser and thermometer, the polyurethane dispersion is synthesized in accordance with a modified acetone process.

For this purpose, components A1-A7, in the quantities indicated in table 1, are combined together with methyl ethyl ketone, and are reacted with stirring at 80-82° C. The reaction is monitored by titrating the isocyanate content with dibutylamine in accordance with DIN EN ISO 3251. When the isocyanate content is constant and has reached 0.8%-1.2%, based on the solution present, a molar excess of 115%, based on the amount of free NCO measured, of trimethylolpropane is added (n[NCO prepolymer]/n[trimethylolpropane]=1.15). The synthesis is continued until the NCO content has reached a value of less than 0.3%, based on the solution. The viscosity is then 1200-1400 mPas (in 1:1 mixture with N-ethyl-2-pyrrolidone, plate/cone, CAP 03, 5000/s, 23° C.)

The isocyanate which remains is then left to be consumed by reaction with an excess of butanol at 80-82° C. for 3 hours.

For the neutralization, a mixture of diethanolamine and water is then added, and in this way the carboxyl functions are neutralized to an extent of about 65%-70%.

After a further 30 minutes, fully demineralized water is added to give a solids content (without methyl ethyl ketone) of about 28%-30%. The methyl ethyl ketone is then removed by vacuum distillation, and the resin is subsequently adjusted to a solids content as per table 2. PU1 is subsequently admixed with 18% by weight of Pluriol P900 as cosolvent.

TABLE 1

Components for the preparation of the polyurethanes

| | Parts by weight | | | |
|---|---|---|---|---|
| Component | PU1 | PU2 | PU3 | PU4 |
| (A1) Dimethylpropionic acid | 108.9 | 109.5 | 113.1 | 109.0 |
| (A2) Dicyclohexylmethane 4,4'-diisocyanate | 587.7 | 747.4 | | 607.0 |
| (A3) Isophorone diisocyanate | | | 534.8 | |
| (A4) Neopentyl glycol | 22.6 | 79.5 | 36.7 | 35.3 |
| (A5) PolyTHF 2000 | | 1423.9 | 873.3 | 841.2 |
| (A6) PP1 | | | 822.3 | 841.2 |
| (A7) PP2 | 1218.7 | | | |
| (B1) Trimethylolpropane | 56.6 | 86.0 | 66.6 | 64.2 |
| (B2) Diethanolamine | 54.8 | 53.66 | 53.3 | 51.37 |

Examples PU3 and PU4 are dispersions of inventive polymers, and examples PU1 and PU2 are comparative examples.

Table 2 reports parameters of the individual dispersions.

TABLE 2

Parameters of the polyurethanes

| | Parts by weight | | | |
|---|---|---|---|---|
| Component | PU1 | PU2 | PU3 (inventive) | PU4 (inventive) |
| Mn/g/mol | 35 703 | 29 791 | 38 131 | 37 437 |
| Acid number | 24.6 | 18.8 | 19.4 | 18.6 |
| Solids content/% | 30.0 | 30.5 | 34.4 | 34.7 |

Preparation of the Polyurethane PU5

In the same way as for the preparation of the polyurethanes PU1 to PU4, the polyurethane PU5 is prepared by reacting 1227 g of the polyester PP3, 106.80 g of dimethylolpropionic acid, 17.51 g of neopenthyl glycol, 539 g of tetramethylxylylene diisocyanate at a solids content of 60% in methyl ethyl ketone. When an NCO content of 1.0-1.25% has been reached, 90 g of trimethylolpropane are added. As soon as the viscosity as measured with a Brookfield CAP 03 plate/cone viscometer at 10 000/s has reached 300-380 mPas (in dilution with N-ethylpyrrolidone in a ratio of 10:6), any isocyanate present is consumed by reaction with an excess of butylglycol.

Thereafter the methyl ethyl ketone is removed fully by distillation. Dimethylethanolamine is added to make the degree of neutralization 85%. A solids content of 60% is then set using further butylglycol.

Preparation of the Mixing Varnish

To prepare the mixing varnish, first of all components A1 and A2 are combined as per table 3 and mixed. When a homogeneous mixture is obtained, components B1 to B4 in the order stated are added with stirring.

TABLE 3

Components for preparing the mixing varnish

| Component | Parts by weight |
|---|---|
| (A1) Water | 300 |
| (A2) Phyllosilicate (Laponite RD) | 10 |
| (B1) Polyurethane binder composition (25% solids, 5% Pluriol P900, 70% water) | 228 |
| (B2) Acrylate thickener | 1 |
| (B3) Dimethylethanolamine | 2 |
| (B4) Water | 450 |

Preparation of Waterborne Basecoat Materials

The waterborne basecoat materials were prepared by combining the constituents listed in table 4 and milling them in a laboratory bead mill to a Hegmann particle size of 5 micrometers.

Each of the waterborne basecoat materials is subsequently admixed with 140 parts by weight of the mixing varnish.

TABLE 4

Components for preparing the waterborne basecoat materials

| | Parts by weight | | | |
|---|---|---|---|---|
| Component | E1 | E2 | E3 (inventive) | E4 (inventive) |
| PU5 | 10 | 10 | 10 | 10 |
| PU1 | 47 | | | |

TABLE 4-continued

Components for preparing the waterborne basecoat materials

| | Parts by weight | | | |
|---|---|---|---|---|
| Component | E1 | E2 | E3 (inventive) | E4 (inventive) |
| PU2 | | 46.2 | | |
| PU3 | | | 41.0 | |
| PU4 | | | | 40.6 |
| Fully demineralized water | 13.9 | 14.6 | 19.8 | 20.3 |
| Polyurethane thickener | 0.14 | 0.14 | 0.14 | 0.14 |
| Heliogen Green L9361 | 25 | 25 | 25 | 25 |
| Wetting agent based on an unsaturated diol | 4 | 4 | 4 | 4 |

Production of Multicoat Paint Systems, and Performance Analysis of the Multicoat Paint Systems The resulting basecoat materials E1 to E4 are each applied with 2.5 spray passes in a film thickness of 10-12 μm to a panel coated with cathodic electrocoat (Cathoguard 500 black, BASF Coatings GmbH), with a waiting period after each spray pass for the basecoat material to dry to a matt appearance. This is followed by application of a commercial clearcoat material of the Glasurit brand, after which evaporation is allowed to take place at room temperature for 15 minutes, followed by drying in a forced-air oven at 60° C. for 30 minutes.

The panels are then stored at room temperature for 7 days, after which they are stored in an oven at 80° C. for 5 days.

The painted metal panels are then scored using a scoring stylus (e.g., Erichsen model 463) fitted with a 0.5 mm blade, the scoring marks being made twice over a length of 50-60 mm in crosswise fashion at an angle of 90° to one another, and down to the metal. The metal panels are then clamped in so that the scored cross is positioned centrally beneath a circular cutout with a diameter of 40 mm.

At a water temperature of 50±5° and a pressure of 120 bar, and also at a distance of 100±3 mm, the water jet is swung over the cutout 30 times within 30 seconds. The relative fraction of the flaking is then assessed. The results are reported in table 4.

| | E1 | E2 | E3 (inventive) | E4 (inventive) |
|---|---|---|---|---|
| Delamination in % | >95 | 80 | 20 | <5 |

The invention claimed is:

1. A polymer obtained by reacting:
   (A) at least one polymer, prepared by reacting:
      (a) at least one dimer fatty acid, with
      (b) at least one polyether of formula (I):

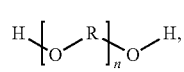
(I)

wherein:
   R is a $C_3$ to $C_6$ alkylene radical,
   n is selected so that said polyether has a number-average molecular weight of 450 to 2,200 g/mol,
   a molar ratio of the components (a) and (b) is 0.7/2.3 to 1.3/1.7, and n
   the polymer (A) has a number-average molecular weight of 1,500 to 5,000 g/mol and an acid number less than 10 mg KOH/g;
   (B) at least one polyether of formula (II):

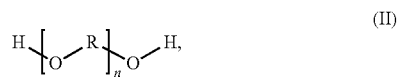
(II)

wherein
   R is a $C_3$ to $C_6$ alkylene radical, and
   n is selected so that said polyether (B) has a number-average molecular weight of 250 to 3,000 g/mol;
   (C) at least one compound having at least one anionic group, at least one functional group capable of forming anions, or both and having at least one isocyanate-reactive functional group, wherein the compound (C) is different from the polyether (A) and the polyether (B);
   (D) at least one polyisocyanate;
   (E) optionally at least one monool or diol which is different from the polyether (A), the polyether (B) and the compound (C); and
   (F) at least one compound having more than two isocyanate-reactive functional groups, wherein the compound (F) is different from the polyether (A), the polyether (B) and the compound (C), and optionally neutralizes the at least one anionic group of the compound (C) that is capable of forming anions.

2. The polymer according to claim 1, wherein the at least one dimer fatty acid (a) comprises at least 90% by weight of dimeric molecules, less than 5% by weight of trimeric molecules, and less than 5% by weight of monomeric molecules and other by-products.

3. The polymer according to claim 1, wherein said polyether of formula (I) is a polypropylene glycol or a polytetrahydrofuran and has a number-average molecular weight of 800 to 1,200 g/mol.

4. The polymer according to claim 1, wherein said polyether of formula (II) is a polypropylene glycol or a polytetrahydrofuran and has a number-average molecular weight of 1,800 to 2,200 g/mol.

5. The polymer according to claim 1, wherein a molar ratio of the dimer fatty acid (a) and the polyether (b) is 0.9/2.1 to 1.1/1.9.

6. The polymer according to claim 1, which has a number-average molecular weight of 5,000 to 50,000 g/mol.

7. The polymer according to claim 1, which has an acid number of less than 50 mg KOH/g.

8. A pigmented aqueous basecoat material, comprising at least one polymer according to claim 1.

9. The pigmented aqueous basecoat material according to claim 8, wherein the sum total of the weight-percentage fractions, based on the total weight of the pigmented aqueous basecoat material, of all polymers is 0.1% to 30% by weight.

10. The pigmented aqueous basecoat material according to claim 8, further comprising, as a further binder, at least one further polyurethane resin which is different from said at least one polymer.

11. A method for promoting adhesion, the method comprising:
   incorporating the polymer according to claim 1 into a pigmented aqueous basecoat material; and forming a polymer film of the pigmented aqueous basecoast material adhered to a surface of a substrate.

12. A method for producing a multicoat paint system, the method comprising:
   (1) applying the pigmented aqueous basecoat material according to claim 8 to a substrate;
   (2) forming a basecoat polymer film from the pigmented aqueous basecoat material applied in step (1);
   (3) applying a clearcoat film to the basecoat polymer film; and subsequently
   (4) curing the basecoat polymer film together with the clearcoat film.

13. The method according to claim 12, wherein said substrate is a multicoat paint system which has defect areas.

14. A multicoat paint system obtained by the method according to claim 12.

15. A multicoat paint system obtained by the method according to claim 13.

\* \* \* \* \*

UNITED STATES PATENT AND TRADEMARK OFFICE
CERTIFICATE OF CORRECTION

PATENT NO. : 10,358,520 B2
APPLICATION NO. : 15/121701
DATED : July 23, 2019
INVENTOR(S) : Bernhard Lettmann et al.

It is certified that error appears in the above-identified patent and that said Letters Patent is hereby corrected as shown below:

On the Title Page (57), Abstract, Line 9, "KOH/a," should read -- KOH/g, --,

In the Specification

Column 1, Line 6, "European." should read -- European --,

Column 1, Line 56, after "receives" insert -- a --,

Column 1, Line 62, after "provide" insert -- a --,

Column 2, Line 38, "0.7/2" should read -- 0.7/2.3 --,

Column 3, Line 33, before "carbon" insert -- 18 --,

Column 3, Line 60, after "by weight" insert -- of --,

Column 4, Line 27, "Ti" should read -- TI --,

Column 4, Line 30, "(i)" should read -- (I) --,

Column 5, Line 4, "KOH/q." should read -- KOH/g. --,

Column 5, Line 27, after "embodiment" insert -- of --,

Column 6, Line 30, "isocyanato-" should read -- 5-isocyanato- --,

Column 6, Line 32, "isocyanato" should read -- 5-isocyanato --,

Signed and Sealed this
Thirty-first Day of March, 2020

Andrei Iancu
*Director of the United States Patent and Trademark Office*

Column 6, Line 55, after "also" insert -- be --,

Column 6, Lines 55-56, "isocyarlurate," should read -- isocyanurate, --,

Column 6, Line 56, "iminooxadiazine-dione," should read -- iminooxadiazinedione, --, Column 7, Line 39, "(B)" should read -- (D) --, Column 7, Line 41, "(B)," should read -- (D), --, Column 7, Line 47, "out" should read -- but --, Column 9, Line 51, after "protect" insert -- a --, Column 9, Line 59, after "2%" insert -- to --, Column 11, Line 20, "Locke" should read -- Lacke --, Column 11, Line 51, "purpose" should read -- purpose. --, Column 12, Line 61, "5" should read -- 5; --, Column 12, Line 65, after "line" insert -- 40; --, Column 14, Lines 2-3, "incorporation poly (ethylene)" should read -- incorporation of poly(ethylene) --, Column 15, Lines 10-11, "vinvlaromatic" should read -- vinylaromatic --, Column 15, Line 48, after "10 to" insert -- 40 --, Column 16, Line 57, after "material to" insert -- a --, Column 17, Line 15, after "If" insert -- a --, Column 17, Line 15, after "coated," insert -- it --, Column 17, Line 49, after "place," insert -- to --, Column 18, Line 67, after "system" insert -- of --, Column 19, Line 29, after "use" insert -- of --, Column 20, Line 46, after "with" insert -- a --, Column 22, Line 53, "5" should read -- < 5 --,

CERTIFICATE OF CORRECTION (continued)
U.S. Pat. No. 10,358,520 B2

In the Claims

Column 23, Line 55, Claim 1, "polymer," should read -- polyester, --,

Column 24, Line 20, Claim 1, "both" should read -- both, --,

Column 24, Line 22, Claim 1, "polyether" should read -- polyester --,

Column 24, Line 25, Claim 1, "polyether" should read -- polyester --,

Column 24, Line 29, Claim 1, "polyether" should read -- polyester --,

Column 24, Line 30, Claim 1, "neutralizes" should read -- neutralizing --,

Column 24, Line 31, Claim 1, "anionic" should read -- functional --.